US011866678B2

(12) United States Patent
Joos et al.

(10) Patent No.: US 11,866,678 B2
(45) Date of Patent: Jan. 9, 2024

(54) FABRIC CARE COMPOSITIONS COMPRISING ACRYLATE PERFUME ENCAPSULATES AND TRIESTER QUATERNARY AMMONIUM SOFTENERS

(71) Applicant: The Procter & Gamble Company, Cincinnati, OH (US)

(72) Inventors: Conny Erna Alice Joos, Buggenhout (BE); Johan Smets, Lubbeek (BE); Marc Johan Declercq, Strombeek-bever (BE); Pierre Daniel Verstraete, Woluwe St Lambert (BE); Linsheng Feng, Menasha, WI (US); Fadi Selim Chakar, Neenah, WI (US); Robert Stanley Bobnock, Menasha, WI (US)

(73) Assignee: The Procter & Gamble Company, Cincinnati, OH (US)

( * ) Notice: Subject to any disclaimer, the term of this patent is extended or adjusted under 35 U.S.C. 154(b) by 25 days.

(21) Appl. No.: 16/907,331

(22) Filed: Jun. 22, 2020

(65) Prior Publication Data

US 2020/0407665 A1  Dec. 31, 2020

Related U.S. Application Data

(60) Provisional application No. 62/867,280, filed on Jun. 27, 2019.

(51) Int. Cl.
| | |
|---|---|
| *C11D 1/62* | (2006.01) |
| *C11D 3/50* | (2006.01) |
| *C11D 3/37* | (2006.01) |
| *C11D 3/382* | (2006.01) |
| *C11D 11/00* | (2006.01) |
| *C11D 17/00* | (2006.01) |
| *A63F 13/245* | (2014.01) |
| *A63F 13/25* | (2014.01) |

(52) U.S. Cl.
CPC ............ *C11D 3/505* (2013.01); *A63F 13/245* (2014.09); *A63F 13/25* (2014.09); *C11D 1/62* (2013.01); *C11D 3/3765* (2013.01); *C11D 3/3773* (2013.01); *C11D 3/382* (2013.01); *C11D 11/0017* (2013.01); *C11D 17/0026* (2013.01); *C11D 17/0039* (2013.01)

(58) Field of Classification Search
CPC ....... C11D 11/0017; C11D 3/505; C11D 3/30; C11D 17/0039; C11D 1/62; C11D 3/502
See application file for complete search history.

(56) References Cited

U.S. PATENT DOCUMENTS

| | | | |
|---|---|---|---|
| 7,304,026 B2 * | 12/2007 | Heibel ............... | C11D 17/0039 510/520 |
| 7,932,191 B2 | 4/2011 | Dungworth et al. | |
| 8,784,984 B2 | 7/2014 | Grey | |
| 9,885,009 B2 | 2/2018 | Brundel et al. | |
| 10,308,894 B2 | 6/2019 | Feng | |
| 2006/0263518 A1 | 11/2006 | Schwantes | |
| 2011/0239377 A1 | 10/2011 | Fossum et al. | |
| 2011/0239378 A1 | 10/2011 | Fossum et al. | |
| 2011/0245139 A1 | 10/2011 | Koehle et al. | |
| 2011/0245140 A1 | 10/2011 | Demeyere | |
| 2014/0338134 A1 * | 11/2014 | Fernandez Prieto | ........................ C11D 17/0039 8/137 |
| 2015/0210959 A1 * | 7/2015 | Schymitzek ......... | C11D 3/0015 510/527 |
| 2016/0108340 A1 * | 4/2016 | Feng ....................... | A61K 8/11 512/4 |
| 2016/0304817 A1 * | 10/2016 | Fernandez Prieto .. | C11D 3/505 |
| 2017/0211019 A1 * | 7/2017 | Sivik ..................... | C11D 3/0015 |
| 2018/0215982 A1 * | 8/2018 | Zhang .................... | C09K 5/066 |
| 2018/0264425 A1 | 9/2018 | Verstraete et al. | |
| 2018/0265811 A1 | 9/2018 | Fernandez Prieto | |
| 2018/0265827 A1 | 9/2018 | Oh | |
| 2018/0362892 A1 * | 12/2018 | Beckholt ................ | C11D 3/505 |
| 2020/0181543 A1 | 6/2020 | Smets | |

FOREIGN PATENT DOCUMENTS

| | | | |
|---|---|---|---|
| JP | 2017537787 A | 12/2017 | |
| JP | 2022507552 A | 1/2022 | |

OTHER PUBLICATIONS

International Search Report and Written Opinion; Application Ser. No. PCT/US2020/070182; dated Oct. 9, 2020, 10 pages.

* cited by examiner

*Primary Examiner* — Charles I Boyer
(74) *Attorney, Agent, or Firm* — Andrew J. Mueller; Gregory S. Darley-Emerson

(57) ABSTRACT

Fabric care compositions that include perfume encapsulates and a quaternary ammonium ester compound, where the shell of the encapsulates include an acrylate or methacrylate material. Related methods of using and making such compositions.

19 Claims, No Drawings

FABRIC CARE COMPOSITIONS COMPRISING ACRYLATE PERFUME ENCAPSULATES AND TRIESTER QUATERNARY AMMONIUM SOFTENERS

FIELD OF THE INVENTION

The present disclosure relates to fabric care composition that include perfume encapsulates and a quaternary ammonium ester compound. The shell of the perfume encapsulates include an acrylate or methacrylate material (e.g., "(meth) acrylate" material). The present disclosure also relates to methods of using and making such compositions.

BACKGROUND OF THE INVENTION

Fabric enhancer compositions continue to be popular with consumers. Such compositions can deliver softness, conditioning, and/or freshness benefits to target fabrics via a variety of benefit agents.

One or more of the benefit agents may be encapsulated, for example in a core-and-shell encapsulate. Encapsulation may facilitate stability of the active, of the composition, or both. Additionally or alternatively, encapsulation may improve delivery of the active ingredient and/or longevity of the intended benefit.

However, improving the deposition efficiency of the encapsulates continues to be a challenge for the manufacturer. Deposition aids may be added to the composition and/or the encapsulate, but such aids can bring additional cost, complexity to the manufacturing process, and/or stability challenges. Furthermore, deposition aids typically do not provide any direct benefit to the target fabrics, instead acting to merely boost the performance/efficiency of the encapsulated benefit agents.

There is a need to provide improved fabric care compositions that include encapsulated benefit agents, preferably via the use of active ingredients that provide direct benefits to target fabrics.

SUMMARY OF THE INVENTION

The present disclosure relates to fabric care compositions that include perfume encapsulates and quaternized ammonium ester compounds.

For example, the present disclosure relates to a fabric care composition that includes perfume encapsulates and a quaternary ammonium ester compound, where the perfume encapsulates include a shell and a core surrounded by the shell, the shell including a (meth)acrylate material, the core comprising perfume, and where: (a) the quaternary ammonium ester compound comprises triester quaternary ammonium material ("triester quat"); and/or (b) the (meth)acrylate material comprises isocyanurate triacrylate monomers, and the quaternary ammonium ester compound is derived from fatty acids having an alkyl portion containing from about 13 to about 22 carbon atoms. For clarity, the composition may be characterized by (a); or the composition may be characterized by (b); or the composition may be characterized by (a) and by (b).

DETAILED DESCRIPTION OF THE INVENTION

The present disclosure relates to fabric care compositions that include certain fabric softening actives and encapsulates that include benefit agents. It has surprisingly been found that improved performance can be obtained by coupling certain quaternary ammonium ester compounds with encapsulates having certain wall materials.

As used herein, the articles "a" and "an" when used in a claim, are understood to mean one or more of what is claimed or described. As used herein, the terms "include," "includes," and "including" are meant to be non-limiting. The compositions of the present disclosure can comprise, consist essentially of, or consist of, the components of the present disclosure.

The terms "substantially free of" or "substantially free from" may be used herein. This means that the indicated material is at the very minimum not deliberately added to the composition to form part of it, or, preferably, is not present at analytically detectable levels. It is meant to include compositions whereby the indicated material is present only as an impurity in one of the other materials deliberately included. The indicated material may be present, if at all, at a level of less than 1%, or less than 0.1%, or less than 0.01%, or even 0%, by weight of the composition.

As used herein the phrase "fabric care composition" includes compositions and formulations designed for treating fabric. Such compositions include but are not limited to, laundry cleaning compositions and detergents, fabric softening compositions, fabric enhancing compositions, fabric freshening compositions, laundry prewash, laundry pretreat, laundry additives, spray products, dry cleaning agent or composition, laundry rinse additive, wash additive, post-rinse fabric treatment, ironing aid, unit dose formulation, delayed delivery formulation, detergent contained on or in a porous substrate or nonwoven sheet, and other suitable forms that may be apparent to one skilled in the art in view of the teachings herein. Such compositions may be used as a pre-laundering treatment, a post-laundering treatment, or may be added during the rinse or wash cycle of the laundering operation.

Unless otherwise noted, all component or composition levels are in reference to the active portion of that component or composition, and are exclusive of impurities, for example, residual solvents or by-products, which may be present in commercially available sources of such components or compositions.

All temperatures herein are in degrees Celsius (° C.) unless otherwise indicated. Unless otherwise specified, all measurements herein are conducted at 20° C. and under the atmospheric pressure.

In all embodiments of the present disclosure, all percentages are by weight of the total composition, unless specifically stated otherwise. All ratios are weight ratios, unless specifically stated otherwise.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

Fabric Care Composition

The present disclosure relates to fabric care compositions. The fabric care compositions of the present disclosure may contain perfume encapsulates and a quaternary ammonium ester compound. Perfume encapsulates may provide aromatic/freshness benefits at various touchpoints, and quaternary ammonium ester compounds may act as fabric conditioning actives that may provide softness, anti-wrinkle, anti-static, conditioning, anti-stretch, color, and/or appearance benefits.

Furthermore, as provided in more detail below, it is believed that by coupling certain encapsulate technologies with certain quaternary ammonium ester compounds, synergistic benefits can be obtained, for example with regard to freshness performance.

In particular, the present disclosure relates to fabric care compositions comprising perfume encapsulates and a quaternary ammonium ester compound, wherein the perfume encapsulates comprise a shell and a core surrounded by the shell, the shell comprising a (meth)acrylate material, the core comprising perfume, and wherein: (a) the quaternary ammonium ester compound comprises triester quaternary ammonium material ("triester quat").

The present disclosure also relates to fabric care compositions comprising perfume encapsulates and a quaternary ammonium ester compound, wherein the perfume encapsulates comprise a shell and a core surrounded by the shell, the shell comprising a (meth)acrylate material, the core comprising perfume, and wherein: (b) the (meth)acrylate material comprises isocyanurate triacrylate monomers, and the quaternary ammonium ester compound is derived from fatty acids having an alkyl portion containing from about 13 to about 22 carbon atoms.

The present disclosure also relates to fabric care compositions comprising perfume encapsulates and a quaternary ammonium ester compound, wherein the perfume encapsulates comprise a shell and a core surrounded by the shell, the shell comprising a (meth)acrylate material, the core comprising perfume, and wherein: (a) the quaternary ammonium ester compound comprises triester quaternary ammonium material ("triester quat"), and (b) the (meth)acrylate material comprises isocyanurate triacrylate monomers, and the quaternary ammonium ester compound is derived from fatty acids having an alkyl portion containing from about 13 to about 22 carbon atoms.

The fabric care compositions, the encapsulates, and the quaternary ammonium ester compounds are described in more detail below.

The fabric care composition may be in any suitable form. For example, the composition may be in the form of a liquid composition, a granular composition, a single-compartment pouch, a multi-compartment pouch, a dissolvable sheet, a pastille or bead, a fibrous article, a tablet, a bar, a flake, a dryer sheet, or a mixture thereof. The composition can be selected from a liquid, solid, or combination thereof. Preferably, the composition is a liquid. The liquid may be encapsulated by water-soluble film to form a unit dose article, such as a pouch.

The composition may be in the form of a liquid. The composition may include water. The composition may be aqueous. The composition, which may be a liquid composition, may comprise at least 50% by weight of water, preferably at least 75%, or even more than 85% by weight of water. The composition may comprise from about 10% to about 90%, by weight of the composition, of water, preferably from about 25% to about 80%, more preferably from about 45% to about 70%. The liquid composition may be a liquid fabric enhancer. The liquid may be packaged in a pourable bottle. The liquid may be packaged in an aerosol can or other spray bottle.

The composition may be in the form of a unitized dose article, such as a tablet, a pouch, a sheet, or a fibrous article. Such pouches typically include a water-soluble film, such as a polyvinyl alcohol water-soluble film, that at least partially encapsulates a composition. Suitable films are available from MonoSol, LLC (Indiana, USA). The composition can be encapsulated in a single or multi-compartment pouch. A multi-compartment pouch may have at least two, at least three, or at least four compartments. A multi-compartmented pouch may include compartments that are side-by-side and/or superposed. The composition contained in the pouch or compartments thereof may be liquid, solid (such as powders), or combinations thereof. Pouched compositions may have relatively low amounts of water, for example less than about 20%, or less than about 15%, or less than about 12%, or less than about 10%, or less than about 8%, by weight of the detergent composition, of water.

The fabric care composition may have a viscosity of from 1 to 1500 centipoises (1-1500 mPa*s), from 100 to 1000 centipoises (100-1000 mPa*s), or from 200 to 500 centipoises (200-500 mPa*s) at 20 $s^{-1}$ and 21° C.

The fabric care compositions of the present disclosure may be characterized by a pH of from about 2 to about 12, or from about 2 to about 8.5, or from about 2 to about 7, or from about 2 to about 5. The compositions of the present disclosure may have a pH of from about 2 to about 4, preferably a pH of from about 2 to about 3.7, more preferably a pH from about 2 to about 3.5, preferably in the form of an aqueous liquid. It is believed that such pH levels facilitate stability of the quaternary ammonium ester compound. The pH of a composition is determined by dissolving/dispersing the composition in deionized water to form a solution at 10% concentration, at about 20° C.

Encapsulates

The fabric care compositions of the present disclosure comprise encapsulates. As more than one encapsulate is typically present, the compositions may be described as comprising a plurality or population of encapsulates.

The composition may comprise from about 0.05% to about 20%, or from about 0.05% to about 10%, or from about 0.1% to about 5%, or from about 0.2% to about 2%, by weight of the composition, of encapsulates. The composition may comprise a sufficient amount of encapsulates to provide from about 0.05% to about 10%, or from about 0.1% to about 5%, or from about 0.1% to about 2%, by weight of the composition, of perfume to the composition. When discussing herein the amount or weight percentage of the encapsulates, it is meant the sum of the shell material and the core material.

The encapsulates may have a volume weighted median encapsulate size from about 0.5 microns to about 100 microns, or even 10 to 100 microns, preferably from about 1 micron to about 60 microns, or even 10 microns to 50 microns, or even 20 microns to 45 microns, or alternatively 20 microns to 60 microns.

Core

The encapsulates of the present disclosure may comprise a core. The core may be surrounded by a shell. The core may comprise a perfume. The perfume may comprise a single perfume raw material or a mixture of perfume raw materials.

The term "perfume raw material" (or "PRM") as used herein refers to compounds having a molecular weight of at least about 100 g/mol and which are useful in imparting an odor, fragrance, essence, or scent, either alone or with other perfume raw materials. Typical PRMs comprise inter alia alcohols, ketones, aldehydes, esters, ethers, nitriles and alkenes, such as terpene. A listing of common PRMs can be found in various reference sources, for example, "Perfume and Flavor Chemicals", Vols. I and II; Steffen Arctander Allured Pub. Co. (1994) and "Perfumes: Art, Science and Technology", Miller, P. M. and Lamparsky, D., Blackie Academic and Professional (1994).

The PRMs may be characterized by their boiling points (B.P.) measured at the normal pressure (760 mm Hg), and their octanol/water partitioning coefficient (P), which may be described in terms of log P, determined according to the test method below. Based on these characteristics, the PRMs may be categorized as Quadrant I, Quadrant II, Quadrant III, or Quadrant IV perfumes, as described in more detail below. A perfume having a variety of PRMs from different quadrants may be desirable, for example, to provide fragrance benefits at different touchpoints during normal usage.

The perfume raw materials may comprise a perfume raw material selected from the group consisting of perfume raw materials having a boiling point (B.P.) lower than about 250° C. and a C log P lower than about 3, perfume raw materials having a B.P. of greater than about 250° C. and a C log P of greater than about 3, perfume raw materials having a B.P. of greater than about 250° C. and a C log P lower than about 3, perfume raw materials having a B.P. lower than about 250° C. and a C log P greater than about 3 and mixtures thereof. Perfume raw materials having a boiling point B.P. lower than about 250° C. and a C log P lower than about 3 are known as Quadrant I perfume raw materials. Quadrant 1 perfume raw materials are preferably limited to less than 30% of the perfume composition. Perfume raw materials having a B.P. of greater than about 250° C. and a C log P of greater than about 3 are known as Quadrant IV perfume raw materials, perfume raw materials having a B.P. of greater than about 250° C. and a C log P lower than about 3 are known as Quadrant II perfume raw materials, perfume raw materials having a B.P. lower than about 250° C. and a C log P greater than about 3 are known as a Quadrant III perfume raw materials. Suitable Quadrant I, II, III and IV perfume raw materials are disclosed in U.S. Pat. No. 6,869,923 B1.

The perfume in the core may contain a mixture of perfume raw materials. The perfume in the core may comprise at least three, or at least four, or at least five, or at least six, or at least seven, or at least eight, or at least nine, or at least ten perfume raw materials. A mixture of perfume raw materials may provide more complex and desirable aesthetics, and/or better perfume performance or longevity, for example at a variety of touchpoints.

It may be that the perfume in the core comprises less than about fifty, or less than about forty, or less than about thirty, or less than about twenty-five, or less than about twenty perfume raw materials. It may be desirable to limit the number of perfume raw materials in the perfume as a way to reduce or limit formulation complexity and/or cost.

The perfume may comprise at least one perfume raw material that is naturally derived. Such components may be desirable for sustainability/environmental reasons. Naturally derived perfume raw materials may include natural extracts or essences, which may contain a mixture of PRMs. Such natural extracts or essences may include orange oil, lemon oil, rose extract, lavender, musk, patchouli, balsamic essence, sandalwood oil, pine oil, cedar, and the like.

The core of the encapsulates of the present disclosure may comprise a partitioning modifier. The core may comprise, in addition to the encapsulated benefit agent, from greater than 0% to about 80%, preferably from greater than 0% to about 50%, more preferably from greater than 0% to about 30%, most preferably from greater than 0% to about 20%, based on total core weight, of a partitioning modifier.

The partitioning modifier may comprise a material selected from the group consisting of vegetable oil, modified vegetable oil, mono-, di-, and tri-esters of $C_4$-$C_{24}$ fatty acids, isopropyl myristate, dodecanophenone, lauryl laurate, methyl behenate, methyl laurate, methyl palmitate, methyl stearate, and mixtures thereof. The partitioning modifier may preferably comprise or consist of isopropyl myristate. The modified vegetable oil may be esterified and/or brominated. The modified vegetable oil may preferably comprise castor oil and/or soy bean oil. US Patent Application Publication 20110268802, incorporated herein by reference, describes other partitioning modifiers that may be useful in the presently described perfume encapsulates.

Shell

The encapsulates may comprise a shell. The shell may, partially or completely, surround the core.

The shell may comprise a polymeric material. The polymeric material may comprise a (meth)acrylate material. As described above, perfumes having an acid value of greater than 5.0 mg KOH/g have been found to perform surprising well when encapsulated in a shell comprising an acrylate material. The polymeric material of the shell may be formed, at least in part, by a radical polymerization process.

The acrylate material of the shell may include a (meth)acrylate material selected from the group consisting of a polyacrylate, a polyethylene glycol acrylate, a polyurethane acrylate, an epoxy acrylate, a polymethacrylate, a polyethylene glycol methacrylate, a polyurethane methacrylate, an epoxy methacrylate, and mixtures thereof.

As used herein, reference to the term "(meth)acrylate" or "(meth)acrylic" is to be understood as referring to both the acrylate and the methacrylate versions of the specified monomer, oligomer and/or prepolymer. For example, "allyl (meth)acrylate" indicates that both allyl methacrylate and allyl acrylate are possible, similarly reference to alkyl esters of (meth)acrylic acid indicates that both alkyl esters of acrylic acid and alkyl esters of methacrylic acid are possible, similarly poly(meth)acrylate indicates that both polyacrylate and polymethacrylate are possible. Poly(meth)acrylate materials are intended to encompass a broad spectrum of polymeric materials including, for example, polyester poly(meth)acrylates, urethane and polyurethane poly(meth)acrylates (especially those prepared by the reaction of an hydroxyalkyl (meth)acrylate with a polyisocyanate or a urethane polyisocyanate), methylcyanoacrylate, ethylcyanoacrylate, diethyleneglycol di(meth)acrylate, trimethylolpropane tri(meth)acrylate, ethylene glycol di(meth)acrylate, allyl (meth)acrylate, glycidyl (meth)acrylate, (meth)acrylate functional silicones, di-, tri- and tetraethylene glycol di(meth)acrylate, dipropylene glycol di(meth)acrylate, polyethylene glycol di(meth)acrylate, di(pentamethylene glycol) di(meth)acrylate, ethylene di(meth)acrylate, neopentyl glycol di(meth)acrylate, trimethylol propane tri(meth)acrylate, ethoxylated bisphenol A di(meth)acrylates, bisphenol A di(meth)acrylates, diglycerol di(meth)acrylate, tetraethylene glycol dichloroacrylate, 1,3-butanediol di(meth)acrylate, neopentyl di(meth)acrylate, trimethylolpropane tri(meth)acrylate, polyethylene glycol di(meth)acrylate and dipropylene glycol di(meth)acrylate and various multifunctional (meth)acrylates. Monofunctional acrylates, i.e., those containing only one acrylate group, may also be advantageously used. Typical monoacrylates include 2-ethylhexyl (meth)acrylate, 2-hydroxyethyl (meth)acrylate, cyanoethyl (meth)acrylate, 2-hydroxypropyl (meth)acrylate, p-dimethylaminoethyl (meth)acrylate, lauryl (meth)acrylate, cyclohexyl (meth)acrylate, tetrahydrofurfuryl (meth)acrylate, chlorobenzyl (meth)acrylate, aminoalkyl(meth)acrylate, various alkyl(meth)acrylates and glycidyl (meth)acrylate. Mixtures of (meth)acrylates or their derivatives as well as combinations of one or more (meth)acrylate monomers, oligomers and/or prepolymers or their derivatives with other copolymerizable monomers, including acrylonitriles and methacrylonitriles may be used as well.

The main said shell material may comprise polyacrylate. The shell material may include from about 25% to about 100%, or from about 50% to about 100%, or from about 65% to about 100%, by weight of the shell material, of a polyacrylate polymer. The polyacrylate may include a polyacrylate cross linked polymer.

The (meth)acrylate material of the encapsulates may include a polymer derived from a material that comprises one or more multifunctional acrylate moieties. The multifunctional acrylate moiety may be selected from the group consisting of tri-functional acrylate, tetrafunctional acrylate, penta-functional acrylate, hexa-functional acrylate, hepta-functional acrylate and mixtures thereof. The multifunctional acrylate moiety is preferably hexa-functional acrylate. The acrylate material may include a polyacrylate that comprises a moiety selected from the group consisting of an acrylate moiety, methacrylate moiety, amine acrylate moiety, amine methacrylate moiety, a carboxylic acid acrylate moiety, carboxylic acid methacrylate moiety, and combinations thereof, preferably an amine methacrylate or carboxylic acid acrylate moiety.

The (meth)acrylate material may include a material that comprises one or more multifunctional acrylate and/or multifunctional methacrylate moieties. The ratio of material that comprises one or more multifunctional acrylate moieties to material that comprises one or more methacrylate moieties may be from about 999:1 to about 6:4, preferably from about 99:1 to about 8:1, more preferably from about 99:1 to about 8.5:1.

Examples of multifunctional acrylates include commercial materials from Sartomer Inc., such as CN975 (a hexafunctional aromatic urethane acrylate), CN9006 (a hexafunctional aliphatic urethane acrylate), CN296, CN293, CN2295 (a hexafunctional polyester acrylate oligomer or acrylated polyester), CN2282, CN294E, CN299 (a tetrafunctional polyester acrylate oligomer or acrylated polyester), SR494, SR295, SR255 (a tetrafunctional acrylate oligomer), SR9009, SR9011 (a trifunctional methacrylate oligomer), SR929 (a polyester urethane acrylate oligomer), SR9053 (an acid ester trifunctional acrylate oligomer), CN989, CN9301 (an aliphatic urethane acrylate), SR350, SR353 (a trifunctional acrylate oligomer), SR9012 (a trifunctional acrylate ester), and/or SR368 (a tris (2-hydroxyethyl)isocyanurate triacrylate).

The acrylate material may be derived from a monomer selected from a hexafunctional acrylate, a triacrylate, or mixtures thereof, preferably a hexafunctional aromatic acrylate, an isocyanurate triacrylate, or mixtures thereof, more preferably a hexafunctional aromatic urethane acrylate, a tris (2-hydroxyethyl)isocyanurate triacrylate, or mixtures thereof, as such materials have be found to be useful in making robust capsules.

The shells of the particles described herein may comprise a poly(meth)acrylate polymer comprising a reaction product of at least one monomer or oligomer thereof. The monomer comprises a structure according to Formula I:

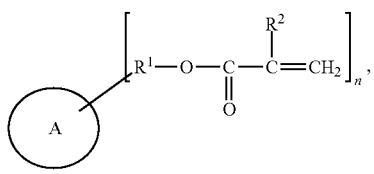

wherein $R^1$ is selected from $C_1$ to $C_8$, $R^2$ is hydrogen or methyl, wherein n is an integer from 1 to 3, and A is a ring structure selected from any of those selected from Formulas II-VI:

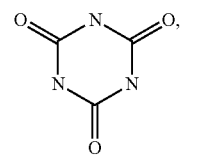

II

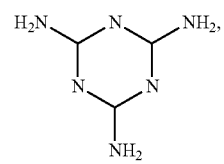

III

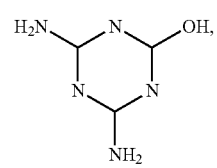

IV

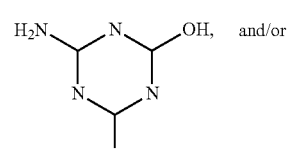

V and/or

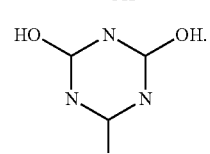

VI

The shell of the encapsulates may be substantially free of melamine derivatives. Melamine derivatives may include polymers or other material that are derived from melamine-based monomers, for example melamine-formaldehyde material. The shell of the encapsulates may be substantially free of melamine-formaldehyde material. Without wishing to be bound by theory, it is believed that melamine-formaldehyde materials provide relatively strong negative charges to encapsulate shells, resulting in poor interactions and/or performance with quaternary ammonium ester compounds, particular certain compounds comprising triester quats and/or derived from triethanolamines.

The encapsulate, based on total encapsulate weight, may comprise from about 0.5% to about 40%, more preferably 0.8% to 5% of an emulsifier. Emulsifiers may be useful as processing aids during formation of the encapsulates. The emulsifier may be embedded in and/or located on the shell. The emulsifier may be selected from the group consisting of polyvinyl alcohol, carboxylated or partially hydrolyzed polyvinyl alcohol, methyl cellulose, hydroxyethylcellulose, carboxymethylcellulose, methylhydroxypropylcellulose, salts or esters of stearic acid, lecithin, organosulphonic acid, 2-acrylamido-2-alkylsulphonic acid, styrene sulphonic acid, polyvinylpyrrolidone, copolymers of N-vinylpyrrolidone, polyacrylic acid, polymethacrylic acid; copolymers of acrylic acid and methacrylic acid, and water-soluble surfactant polymers which lower the surface tension of water.

The emulsifier preferably comprises polyvinyl alcohol. Preferably, the polyvinylalcohol has at least one the following properties, or a mixture thereof: (i) a hydrolysis degree from 70% to 99%, preferably 75% to 98%, more preferably from 80% to 96%, more preferably from 82% to 96%, most preferably from 86% to 94%; and/or (ii) a viscosity of from 2 mPa·s to 150 mPa·s, preferably from 3 mPa·s to 70 mPa·s, more preferably from 4 mPa·s to 60 mPa·s, even more preferably from 5 mPa·s to 55 mPa·s in 4% water solution at 20° C. Suitable polyvinylalcohol materials may be selected from Selvol 540 PVA (Sekisui Specialty Chemicals, Dallas, TX), Mowiol 18-88=Poval 18-88, Mowiol 3-83, Mowiol 4-98=Poval 4-98 (Kuraray), Poval KL-506=Poval 6-77 KL (Kuraray), Poval R-1130=Poval 25-98 R (Kuraray), Gohsenx K-434 (Nippon Gohsei).

The encapsulates of the present disclosure may comprise a coating. The shell may comprise the coating; for example, the coating may be on an outer surface of the shell. The encapsulates may be manufactured and be subsequently coated with a coating material. The coating may be useful as a deposition aid. Non-limiting examples of coating materials include but are not limited to materials selected from the group consisting of poly(meth)acrylate, poly(ethylene-maleic anhydride), polyamine, wax, polyvinylpyrrolidone, polyvinylpyrrolidone co-polymers, polyvinylpyrrolidone-ethyl acrylate, polyvinylpyrrolidone-vinyl acrylate, polyvinylpyrrolidone methacrylate, polyvinylpyrrolidone/vinyl acetate, polyvinyl acetal, polyvinyl butyral, polysiloxane, poly(propylene maleic anhydride), maleic anhydride derivatives, co-polymers of maleic anhydride derivatives, polyvinyl alcohol, styrene-butadiene latex, gelatin, gum Arabic, carboxymethyl cellulose, carboxymethyl hydroxyethyl cellulose, hydroxyethyl cellulose, other modified celluloses, sodium alginate, chitosan, casein, pectin, modified starch, polyvinyl acetal, polyvinyl butyral, polyvinyl methyl ether/maleic anhydride, polyvinyl pyrrolidone and its co polymers, poly(vinyl pyrrolidone/methacrylamidopropyl trimethyl ammonium chloride), polyvinylpyrrolidone/vinyl acetate, polyvinyl pyrrolidone/dimethylaminoethyl methacrylate, polyvinyl amines, polyvinyl formamides, polyallyl amines and copolymers of polyvinyl amines, polyvinyl formamides, and polyallyl amines and mixtures thereof. The coating material may be a cationic polymer. The coating material may comprise chitosan.

The compositions may comprise encapsulates according to the present disclosure wherein at least 75% of the encapsulates have an encapsulate shell thickness of from about 10 nm to about 350 nm, from about 20 nm to about 200 nm, or from 25 nm to about 180 nm, as determined by the Encapsulate Shell Thickness test method described herein.

Quaternary Ammonium Ester Compound

The composition may comprise a quaternary ammonium ester compound, which may act as a fabric conditioning active ("FCA"). The type and amount of quaternary ammonium ester compound may be selected for the target benefit to be delivered and/or the fabrics targeted for treatment.

The quaternary ammonium ester compound (sometimes referred to as an "ester quat") may be present at a level of from about 0.1% to about 50%, or from about 2% to about 40%, or from about 3% to about 25%, preferably from 4% to 18%, more preferably from 5% to 15%, by weight of the composition. The quaternary ammonium ester compound may be present at a level of from greater than 0% to about 30%, or from about 1% to about 25%, or from about 3% to about 20%, or from about 4.0% to 18%, more preferably from 4.5% to 15%, even more preferably from 5.0% to 12% by weight of the composition. The quaternary ammonium ester compound may be present at a level of from about 1% to about 8%, or from about 1.5% to about 5%, by weight of the fabric care composition. The level of quaternary ammonium ester compound may depend of the desired concentration of total fabric conditioning active in the composition (diluted or concentrated composition) and of the presence (or not) of other FCAs. However, the risk on increasing viscosities over time is typically higher in fabric treatment compositions with higher FCA levels. On the other hand, at very high FCA levels, the viscosity may no longer be sufficiently controlled which renders the product unfit for use.

Quaternary ammonium ester compounds may be derived from fatty acids (sometimes called parent fatty acids). The fatty acids may include saturated fatty acids and/or unsaturated fatty acids. The fatty acids may be characterized by an iodine value (see Methods). Preferably, the iodine value of the fatty acid from which the quaternary ammonium fabric compound is formed is from 0 to 140, or from 0 to about 90, or from about 10 to about 70, or from about 15 to about 50, or from about 18 to about 30. The iodine value may be from about 25 to 50, preferably from 30 to 48, more preferably from 32 to 45. Without being bound by theory, lower melting points resulting in easier processability of the FCA are obtained when the fatty acid from which the quaternary ammonium compound is formed is at least partially unsaturated. In particular, it is believed that double unsaturated fatty acids enable easy-to-process FCAs.

The fatty acids may include an alkyl portion containing, on average by weight, from about 13 to about 22 carbon atoms, or from about 14 to about 20 carbon atoms, preferably from about 16 to about 18 carbon atoms.

Suitable fatty acids may include those derived from (1) an animal fat, and/or a partially hydrogenated animal fat, such as beef tallow, lard, etc.; (2) a vegetable oil, and/or a partially hydrogenated vegetable oil such as canola oil, safflower oil, peanut oil, sunflower oil, sesame seed oil, rapeseed oil, cottonseed oil, corn oil, soybean oil, tall oil, rice bran oil, palm oil, palm kernel oil, coconut oil, other tropical palm oils, linseed oil, tung oil, etc.; (3) processed and/or bodied oils, such as linseed oil or tung oil via thermal, pressure, alkali-isomerization and catalytic treatments; (4) a mixture thereof, to yield saturated (e.g. stearic acid), unsaturated (e.g. oleic acid), polyunsaturated (linoleic acid), branched (e.g. isostearic acid) or cyclic (e.g. saturated or unsaturated α-disubstituted cyclopentyl or cyclohexyl derivatives of polyunsaturated acids) fatty acids.

The quaternary ammonium ester compound may comprise compounds formed from fatty acids that are unsaturated. The fatty acids may comprise unsaturated C18 chains, which may be include a single double bond ("C18:1") or may be double unsaturated ("C18:2").

The quaternary ammonium ester compound may be derived from fatty acids and optionally from triethanolamine, preferably unsaturated fatty acids that include eighteen carbons ("C18 fatty acids"), more preferably C18 fatty acids that include a single double bone ("C18:1 fatty acids"). The quaternary ammonium ester compound may comprise from about 10% to about 40%, or from about 10% to about 30%, or from about 15% to about 30%, by weight of the quaternary ammonium ester compound, of compounds derived from triethanolamine and C18:1 fatty acids. Such levels of fatty acids may facilitate handling of the resulting ester quat material.

The fatty acid from which the quaternary ammonium conditioning actives is formed may comprise from 1.0% to 20.0%, preferably from 1.5% to 18.0%, or from 3.0% to 15.0%, more preferably from 4.0% to 15.0% of double unsaturated C18 chains ("C18:2") by weight of total fatty acid chains. From about 2% to about 10%, or from about 2% to about 8%, or from about 2% to about 6%, by weight of the total fatty acids used to form the quaternary ammonium ester compounds, may be C18:2 fatty acids.

On the other hand, very high levels of unsaturated fatty acid chains are to be avoided to minimize malodour formation as a result of oxidation of the fabric softener composition over time.

Suitable quaternary ammonium ester compounds may include materials selected from the group consisting of monoester quaternary material ("monoester quats"), diester quaternary material ("diester quats"), triester quaternary material ("trimester quats"), and mixtures thereof. The level of monoester quat may be from 2.0% to 40.0%, the level of diester quat may be from 40.0% to 98.0%, and the level of triester quat may be from 0.0% to 30.0%, by weight of total quaternary ammonium ester compound. The level of monoester quat may be from 2.0% to 40.0%, the level of diester quat may be from 40.0% to 98.0%, and the level of triester quat may be less than 5.0%, or less than 1.0%, or even 0.0%, by weight of total quaternary ammonium ester compound. The level of monoester quat may be from 15.0% to 35.0%, the level of diester quat may be from 40.0% to 60.0%, and the level of triester quat may be from 15% to 38.0%, by weight of total quaternary ammonium ester compound. The quaternary ammonium ester compound may comprise triester quaternary ammonium material ("triester quats").

Suitable quaternary ammonium ester compounds may be derived from alkanolamines, for example, C1-C4 alkanolamines, preferably C2 alkanolamines (e.g., ethanolamines). The quaternary ammonium ester compounds may be derived from monoalkanolamines, dialkanolamines, trialkanolamines, or mixtures thereof, preferably monoethanolamines, diethanolamines, di-isopropanolamines, triethanolamines, or mixtures thereof. The quaternary ammonium ester compounds may be derived from diethanolamines. The quaternary ammonium ester compounds may be derived from di-isopropanolamines. The quaternary ammonium ester compounds may be derived from triethanolamines. The alkanolamines from which the quaternary ammonium ester compounds are derived may be alkylated mono- or dialkanolamines, for example C1-C4 alkylated alkanolamines, preferably C1 alkylated alkanolamines (e.g, N-methyldiethanolamine).

The quaternary ammonium ester compound may comprise a quaternized nitrogen atom that is substituted, at least in part. The quaternized nitrogen atom may be substituted, at least in part, with one or more C1-C3 alkyl or C1-C3 hydroxyl alkyl groups. The quaternized nitrogen atom may be substituted, at least in part, with a moiety selected from the group consisting of methyl, ethyl, propyl, hydroxyethyl, 2-hydroxypropyl, 1-methyl-2-hydroxyethyl, poly($C_2$-$C_3$ alkoxy), polyethoxy, benzyl, more preferably methyl or hydroxyethyl.

The quaternary ammonium ester compound may comprise compounds according to Formula (I):

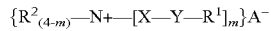   Formula (I)

wherein:
m is 1, 2 or 3, with provisos that, in a given molecule, the value of each m is identical, and when (a) the quaternary ammonium ester compound comprises triester quaternary ammonium material ("triester quat"), for at least some of the compounds according to Formula (I), m is 3 (i.e., a triester);

each $R^1$, which may comprise from 13 to 22 carbon atoms, is independently a linear hydrocarbyl or branched hydrocarbyl group, preferably $R^1$ is linear, more preferably $R^1$ is partially unsaturated linear alkyl chain;

each $R^2$ is independently a $C_1$-$C_3$ alkyl or hydroxyalkyl group and/or each $R^2$ is selected from methyl, ethyl, propyl, hydroxyethyl, 2-hydroxypropyl, 1-methyl-2-hydroxyethyl, poly($C_2$-$C_3$ alkoxy), polyethoxy, benzyl, more preferably methyl or hydroxyethyl;

each X is independently —($CH_2$)n-, —$CH_2$—CH($CH_3$)— or —CH($CH_3$)—$CH_2$—, where each n is independently 1, 2, 3 or 4, preferably each n is 2;

each Y is independently —O—(O)C— or —C(O)—O—; and

A– is independently selected from the group consisting of chloride, bromide, methyl sulfate, ethyl sulfate, sulfate, and nitrate, preferably A– is selected from the group consisting of chloride and methyl sulfate, more preferably A– is methyl sulfate.

At least one X, preferably each X, may be independently selected from —$CH_2$—CH($CH_3$)— or —CH($CH_3$)—$CH_2$—. When m is 2, X may be selected from *—$CH_2$—CH($CH_3$)—, *—CH($CH_3$)—$CH_2$—, or a mixture thereof, where the * indicates the end nearest the nitrogen of the quaternary ammonium ester compound. When there are two or more X groups present in a single compound, at least two of the X groups may be different from each other. For example, when m is 2, one X (e.g., a first X) may be *—$CH_2$—CH($CH_3$)—, and the other X (e.g., a second X) may be *—CH($CH_3$)—$CH_2$—, where the * indicates the end nearest the nitrogen of the quaternary ammonium ester compound. It has been found that such selections of the m index and X groups can improve the hydrolytic stability of the quaternary ammonium ester compound, and hence further improve the stability of the composition.

For similar stability reasons, the quaternary ammonium ester compound may comprise a mixture of: bis-(2-hydroxypropyl)-dimethylammonium methylsulfate fatty acid ester; (2-hydroxypropyl)-(1-methyl-2-hydroxyethyl)-dimethylammonium methylsulfate fatty acid ester; and bis-(1-methyl-2-hydroxyethyl)-dimethylammonium methylsulfate fatty acid ester; where the fatty acid esters are produced from a C12-C18 fatty acid mixture. The quaternary ammonium ester compound may comprise any of the fatty acid esters, individually or as a mixture, listed in this paragraph.

Each X may be —($CH_2$)n-, where each n is independently 1, 2, 3 or 4, preferably each n is 2.

Each $R^1$ group may correspond to, and/or be derived from, the alkyl portion(s) of any of the parent fatty acids provided above. The $R^1$ groups may comprise, by weight average, from about 13 to about 22 carbon atoms, or from about 14 to about 20 carbon atoms, preferably from about 16 to about 18 carbon atoms. It may be that when Y is *—O—(O)C— (where the * indicates the end nearest the X moiety), the sum of carbons in each IV is from 13 to 21, preferably from 13 to 19.

The quaternary ammonium compounds of the present disclosure may include a mixture of quaternary ammonium compounds according to Formula (I), for example, having some compounds where m=1 (e.g., monoesters) and some compounds where m=2 (e.g., diesters). Some mixtures may even contain compounds where m=3 (e.g., triesters). The quaternary ammonium compounds may include compounds according to Formula (I), where m is 1 or 2, but not 3 (e.g., is substantially free of triesters).

The quaternary ammonium compounds of the present disclosure may include compounds according to Formula (I), wherein each $R^2$ is a methyl group. The quaternary ammonium compounds of the present disclosure may include compounds according to Formula (I), wherein at least one $R^2$, preferably wherein at least one $R^2$ is a hydroxyethyl group and at least one $R^2$ is a methyl group. For compounds according to Formula (I), m may equal 1, and only one $R^2$ may be a hydroxyethyl group.

The quaternary ammonium compounds of the present disclosure may include methyl sulfate as a counterion. When the quaternary ammonium ester compounds of the present disclosure comprise compounds according to Formula (I), A– may preferably be methyl sulfate. Without wishing to be bound by theory, it is believed that esterquats with a methyl sulphate as a counterion have lower electrostatic repulsive forces compared to those with chloride, as the methylsulphate counterion is bound more tightly compared to chloride. Therefore, it is believed that the electrostatic repulsive forces are relatively reduced because of the interaction between the esterquat and the methylsulphate ions. Thus, methyl-sulphate based esterquats may yield relatively less-charged structures, which may result in relatively stronger interactions with neutral surfaces. It is believed, then, that particles with a more neutral charge may interact more with these more neutral materials and/or surfaces of vesicles formed therefrom, resulting in more effective deposition onto target surfaces such as fabrics, compared to interactions between more positively charged capsules and such materials/vesicles.

The quaternary ammonium compounds of the present disclosure may comprise one or members selected from the group consisting of:

(A) bis-(2-hydroxypropyl)-dimethylammonium methylsulfate fatty acid ester and isomers of bis-(2-hydroxypropyl)-dimethylammonium methylsulfate fatty acid ester and/or mixtures thereof; N,N-bis-(2-(acyl-oxy)-propyl)-N,N-dimethylammonium methylsulfate and/or N-(2-(acyl-oxy)-propyl)N-(2-(acyl-oxy) 1-methyl-ethyl) N,N-dimethylammonium methylsulfate and/or mixtures thereof, in which the acyl moiety is derived from c12-c22 fatty acids such as Palm, Tallow, Canola and/or other suitable fatty acids, which can be fractionated and/or hydrogenated, and/or mixtures thereof;

(B) 1,2-di(acyloxy)-3-trimethylammoniopropane chloride in which the acyl moiety is derived from c12-c22 fatty acids such as Palm, Tallow, Canola and/or other suitable fatty acids, which can be fractionated and/or hydrogenated, and/or mixtures thereof;

(C) N,N-bis(hydroxyethyl)-N,N-dimethyl ammonium chloride fatty acid esters; N,N-bis(acyl-oxy-ethyl)-N,N-dimethyl ammonium chloride in which the acyl moiety is derived from c12-c22 fatty acids such as Palm, Tallow, Canola and/or other suitable fatty acids, which can be fractionated and/or hydrogenated, and/or mixtures thereof, such as N,N-bis (tallowoyl-oxy-ethyl) N,N-dimethyl ammonium chloride;

(D) esterification products of Fatty Acids with Triethanolamine, quaternized with Dimethyl Sulphate; N,N-bis (acyl-oxy-ethyl)N-(2-hydroxyethyl)-N-methyl ammonium methylsulfate in which the acyl moiety is derived from c12-c22 fatty acids such as Palm, Tallow, Canola and/or other suitable fatty acids, which can be fractionated and/or hydrogenated, and/or mixtures thereof, such as N,N-bis (tallowoyl-oxy-ethyl)N-(2-hydroxyethyl)-N-methyl ammonium methylsulfate;

(E) dicanoladimethylammonium chloride; di(hard)tallowdimethylammonium chloride; dicanoladimethylammonium methylsulfate; 1-methyl-1-stearoylamidoethyl-2-stearoylimidazolinium methylsulfate; 1-tallowylamidoethyl-2-tallowylimidazoline; dipalmylmethyl hydroxyethylammoinum methylsulfate; and/or (F) mixtures thereof.

Examples of suitable quaternary ammonium ester compound are commercially available from Evonik under the tradename Rewoquat WE18 and/or Rewoquat WE20, and from Stepan under the tradename Stepantex GA90, Stepantex VK90, and/or Stepantex VL90A.

It is understood that compositions that comprise a quaternary ammonium ester compound as a fabric conditioning active may further comprise non-quaternized derivatives of such compounds, as well as unreacted reactants (e.g., free fatty acids).

The fabric care compositions of the present disclosure may comprise other fabric conditioning actives, for example in addition to a quaternary ammonium ester compound. Other FCAs may include silicones, non-ester quaternary ammonium compounds, amines, fatty esters, sucrose esters, silicones, dispersible polyolefins, polysaccharides, fatty acids, softening or conditioning oils, polymer latexes, or combinations thereof, preferably silicone. The combined total amount of quaternary ammonium ester compound and silicone may be from about 5% to about 70%, or from about 6% to about 50%, or from about 7% to about 40%, or from about 10% to about 30%, or from about 15% to about 25%, by weight of the composition. The composition may include a quaternary ammonium ester compound and silicone in a weight ratio of from about 1:10 to about 10:1, or from about 1:5 to about 5:1, or from about 1:3 to about 1:3, or from about 1:2 to about 2:1, or about 1:1.5 to about 1.5:1, or about 1:1.

Compositions according to the present disclosure that include the following combinations of encapsulate shell materials and ester quats may be particularly useful for delivering freshness benefits to fabric: (a) where the (meth) acrylate material of the encapsulate shell is selected from a polyacrylate derived from a hexafunctional acrylate monomer and/or a polyacrylate from an isocyanurate triacrylate monomer, coupled with a quaternary ammonium ester compound comprising triester quaternary ammonium material ("triester quat"), preferably one that is derived from a triethanolamine and/or includes methyl sulfate as a counterion; and/or (b) where the (meth)acrylate material comprises isocyanurate triacrylate monomers, preferably a tris (2-hydroxyethyl) isocyanurate triacrylate monomer, coupled with a quaternary ammonium ester compound that is derived from fatty acids having an alkyl portion containing from about 13 to about 22 carbon atoms, preferably an ester quat derived from a diethanolamine, a di-isopropanolamine, and/or a triethanolamine, more preferably an ester quat that includes methyl sulfate as a counterion.

Deposition Aid

The compositions of the present disclosure may comprise a deposition aid. Deposition aids can facilitate deposition of encapsulates, conditioning actives, perfumes, or combinations thereof, improving the performance benefits of the compositions and/or allowing for more efficient formulation of such benefit agents. The composition may comprise, by weight of the composition, from 0.0001% to 3%, preferably from 0.0005% to 2%, more preferably from 0.001% to 1%, or from about 0.01% to about 0.5%, or from about 0.05% to about 0.3%, of a deposition aid. The deposition aid may be a cationic or amphoteric polymer, preferably a cationic polymer.

Cationic polymers in general and their methods of manufacture are known in the literature. Suitable cationic polymers may include quaternary ammonium polymers known the "Polyquaternium" polymers, as designated by the International Nomenclature for Cosmetic Ingredients, such as Polyquaternium-6 (poly(diallyldimethylammonium chloride), Polyquaternium-7 (copolymer of acrylamide and diallyldimethylammonium chloride), Polyquaternium-10 (quaternized hydroxyethyl cellulose), Polyquaternium-22 (copolymer of acrylic acid and diallyldimethylammonium chloride), and the like.

The deposition aid may be selected from the group consisting of polyvinylformamide, partially hydroxylated polyvinylformamide, polyvinylamine, polyethylene imine, ethoxylated polyethylene imine, polyvinylalcohol, polyacrylates, and combinations thereof. The cationic polymer may comprise a cationic acrylate.

Deposition aids can be added concomitantly with encapsulates (at the same time with, e.g., encapsulated benefit agents) or directly/independently in the fabric treatment composition. The weight-average molecular weight of the polymer may be from 500 to 5000000 or from 1000 to 2000000 or from 2500 to 1500000 Dalton, as determined by size exclusion chromatography relative to polyethyleneoxide standards using Refractive Index (RI) detection. The weight-average molecular weight of the cationic polymer may be from 5000 to 37500 Dalton.

Rheology Modifier/Structurant

The compositions of the present disclosure may contain a rheology modifier and/or a structurant. Rheology modifiers may be used to "thicken" or "thin" liquid compositions to a desired viscosity. Structurants may be used to facilitate phase stability and/or to suspend or inhibit aggregation of particles in liquid composition, such as the encapsulates as described herein.

Suitable rheology modifiers and/or structurants may include non-polymeric crystalline hydroxyl functional structurants (including those based on hydrogenated castor oil), polymeric structuring agents, cellulosic fibers (for example, microfibrillated cellulose, which may be derived from a bacterial, fungal, or plant origin, including from wood), di-amido gellants, or combinations thereof.

Polymeric structuring agents may be naturally derived or synthetic in origin. Naturally derived polymeric structurants may comprise hydroxyethyl cellulose, hydrophobically modified hydroxyethyl cellulose, carboxymethyl cellulose, polysaccharide derivatives and mixtures thereof. Polysaccharide derivatives may comprise pectine, alginate, arabinogalactan (gum Arabic), carrageenan, gellan gum, xanthan gum, guar gum and mixtures thereof. Synthetic polymeric structurants may comprise polycarboxylates, polyacrylates, hydrophobically modified ethoxylated urethanes, hydrophobically modified non-ionic polyols and mixtures thereof. Polycarboxylate polymers may comprise a polyacrylate, polymethacrylate or mixtures thereof. Polyacrylates may comprise a copolymer of unsaturated mono- or di-carbonic acid and $C_1$-$C_{30}$ alkyl ester of the (meth)acrylic acid. Such copolymers are available from Noveon Inc. under the tradename Carbopol Aqua 30. Another suitable structurant is sold under the tradename Rheovis CDE, available from BASF.

Other Adjuncts

The fabric care compositions of the present disclosure may contain other adjuncts that are suitable for inclusion in the product and/or for final usage. For example, the fabric care compositions may comprise neat perfume, perfume delivery technologies (such as pro-perfumes and/or encapsulates having non-acrylate wall materials), cationic surfactants, cationic polymers, solvents, suds supressors, or combinations thereof.

Method of Making a Consumer Product

The present disclosure relates to processes for making any of the compositions described herein. The process of making a composition, which may be a consumer product composition, may comprise the step of combining an encapsulate as described herein with quaternary ammonium ester compounds as described herein.

The encapsulates may be combined with such one or more FCAs when the encapsulates are in one or more forms, including a slurry form, neat encapsulate form, and/or spray dried encapsulate form. The encapsulates may be combined with such FCAs by methods that include mixing and/or spraying.

The fabric care compositions of the present disclosure can be formulated into any suitable form and prepared by any process chosen by the formulator. The encapsulates and adjunct materials may be combined in a batch process, in a circulation loop process, and/or by an in-line mixing process. Suitable equipment for use in the processes disclosed herein may include continuous stirred tank reactors, homogenizers, turbine agitators, recirculating pumps, paddle mixers, plough shear mixers, ribbon blenders, vertical axis granulators and drum mixers, both in batch and, where available, in continuous process configurations, spray dryers, and extruders.

The fabric care composition may be encapsulated in water-soluble film(s) according to known methods to form a unitized dose article.

The fabric care composition may be placed into an aerosol or other spray container according to known methods.

Method of Using a Fabric Care Composition

The present disclosure further relates to methods of using a fabric care composition. For example, the present disclosure relates to methods of treating a fabric with a composition according to the present disclosure. Such methods may provide conditioning and/or freshening benefits.

The method may include a step of contacting a fabric with a fabric care composition of the present disclosure. The composition may be in neat form or diluted in a liquor, for example, a wash or rinse liquor. The composition may be diluted in water prior, during, or after contacting the surface or article. The fabric may be optionally washed and/or rinsed before and/or after the contacting step. The composition may be applied directly onto a fabric or provided to a dispensing vessel or drum of an automatic laundry machine.

The method of treating a fabric may include the steps of: (a) optionally washing, rinsing and/or drying the fabric; (b) contacting the fabric with a composition as described herein, optionally in the presence of water; (c) optionally washing and/or rinsing the fabric; and (d) optionally drying, whether passively and/or via an active method such as a laundry dryer. The method may occur during the wash cycle or the rinse cycle, preferably the rinse cycle, of an automatic washing machine.

For purposes of the present invention, treatment may include but is not limited to, scrubbing and/or mechanical agitation. The fabric may comprise most any fabric capable of being laundered or treated in normal consumer use conditions.

Liquors that comprise the disclosed compositions may have a pH of from about 3 to about 11.5. When diluted, such compositions are typically employed at concentrations of from about 500 ppm to about 15,000 ppm in solution. When the wash solvent is water, the water temperature typically ranges from about 5° C. to about 90° C. and, the water to fabric ratio may be typically from about 1:1 to about 30:1.

Combinations

Specifically contemplated combinations of the disclosure are herein described in the following lettered paragraphs. These combinations are intended to be illustrative in nature and are not intended to be limiting.
- A. A fabric care composition comprising perfume encapsulates and a quaternary ammonium ester compound, wherein the perfume encapsulates comprise a shell and a core surrounded by the shell, the shell comprising a (meth)acrylate material, the core comprising perfume, and wherein: (a) the quaternary ammonium ester compound comprises triester quaternary ammonium material ("triester quat"); and/or (b) the (meth)acrylate material comprises isocyanurate triacrylate monomers, and the quaternary ammonium ester compound is derived from fatty acids having an alkyl portion containing from about 13 to about 22 carbon atoms.
- B. The fabric care composition according to paragraph A, wherein the quaternary ammonium ester compound comprises compounds according to Formula (I):

Formula (I)

wherein: m is 1, 2 or 3, with provisos that in a given molecule, the value of each m is identical, and when the quaternary ammonium ester compound comprises triester quaternary ammonium material ("triester quat"), for at least some of the compounds according to Formula (I), m is 3 (i.e., a triester); each R', which optionally comprises from 13 to 22 carbon atoms, is independently a linear hydrocarbyl or branched hydrocarbyl group, preferably $R^1$ is linear, more preferably $R^1$ is partially unsaturated linear alkyl chain; each $R^2$ is independently a $C_1$-$C_3$ alkyl or hydroxyalkyl group and/or each $R^2$ is selected from methyl, ethyl, propyl, hydroxyethyl, 2-hydroxypropyl, 1-methyl-2-hydroxyethyl, poly($C_2$-$C_3$ alkoxy), polyethoxy, benzyl, more preferably methyl or hydroxyethyl; each X is independently —($CH_2$)n-, —$CH_2$—$CH(CH_3)$— or —$CH(CH_3)$—$CH_2$—, where each n is independently 1, 2, 3 or 4, preferably each n is 2; each Y is independently —O—(O)C— or —C(O)—O—; and A– is independently selected from the group consisting of chloride, bromide, methyl sulfate, ethyl sulfate, sulfate, and nitrate, preferably A– is selected from the group consisting of chloride and methyl sulfate, more preferably A– is methyl sulfate.
- C. The fabric care composition according to paragraph B, wherein in the compound according to Formula (I), A– is methyl sulfate.
- D. The fabric care composition according to any of paragraphs B-C, wherein in at least some of the compounds according to Formula (I), at least one $R^2$ is a hydroxyethyl group, preferably wherein at least one $R^2$ is a hydroxyethyl group and at least one $R^2$ is a methyl group.
- E. The fabric care composition according to any of paragraphs B-D, wherein for at least some of the compounds of Formula (I), m is 2, and each X is selected from *—$CH_2$—$CH(CH_3)$—, *—$CH(CH_3)$—$CH_2$—, or a mixture thereof, where the * indicates the end nearest the nitrogen of the quaternary ammonium ester compound, preferably wherein for at least some of the compounds according to Formula (I), the compounds comprise a first X and a second X, where the first X is *—$CH_2$—$CH(CH_3)$—, and the second X is *—$CH(CH_3)$—$CH_2$—.
- F. The fabric care composition according to any of paragraphs A-E, wherein the quaternary ammonium ester compound comprises a mixture of: bis-(2-hydroxypropyl)-dimethylammonium methylsulfate fatty acid ester, (2-hydroxypropyl)-(1-methyl-2-hydroxyethyl)-dimethylammonium methylsulfate fatty acid ester, and bis-(1-methyl-2-hydroxyethyl)-dimethylammonium methylsulfate fatty acid ester, where the fatty acid esters are produced from a C12-C18 fatty acid mixture.
- G. The fabric care composition according to any of paragraphs A-F, wherein the ammonium quaternary ester compound comprises material derived from unsaturated fatty acids and optionally from triethanolamine, preferably unsaturated fatty acids that include eighteen carbons ("C18"), more preferably C18 fatty acids that include a single double bond ("C18:1 fatty acids"), even more preferably wherein such material is present at a level of from about 10% to about 40%, or from about 10% to about 30%, or from about 15% to about 30%, by weight of the ammonium quaternary ester compound.
- H. The fabric care composition according to any of paragraphs A-G, wherein the quaternary ammonium ester compound comprises from about 40.0% to about 60.0%, by weight of the quaternary ammonium ester compound, of a diester quaternary ammonium material ("diester quat"), and from about 15% to about 38.0%, by weight of the quaternary ammonium ester compound, of triester quat, preferably wherein the quaternary ammonium ester compound further comprises monoester quaternary ammonium material ("monoester quat"), preferably wherein the level of monoester quat is from 15.0% to 35.0%, by weight of the quaternary ammonium ester compound.
- I. The fabric care composition according to any of paragraphs A-H, wherein the quaternary ammonium ester compound is derived from alkanolamines, preferably from monoalkanolamines, dialkanolamines, trialkanolamines, or mixtures thereof, more preferably monoethanolamines, diethanolamines, di-isopropanolamines, triethanolamines, or mixtures thereof.
- J. The fabric care composition according to any of paragraphs A-I, wherein the quaternary ammonium ester compound is derived from fatty acids characterized by an iodine value of from 0 to 140, or from 0 to about 90, or from about 10 to about 70, or from about 15 to about 50, or from about 18 to about 30.
- K. A fabric care composition according to any of paragraphs A-J, wherein the (meth)acrylate material is derived from a monomer selected from a hexafunctional acrylate, a triacrylate, or mixtures thereof, preferably a hexafunctional aromatic acrylate, an isocyanurate triacrylate, or mixtures thereof, more preferably a hexafunctional aromatic urethane acrylate, a tris (2-hydroxyethyl)isocyanurate triacrylate, or mixtures thereof.
- L. The fabric care composition according to any of paragraphs A-K, wherein the (meth)acrylate material comprises isocyanurate triacrylate monomers having a structure according to Formula I:

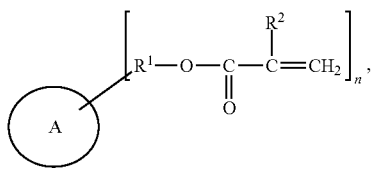

wherein $R^1$ is selected from $C_1$ to $C_8$, $R^2$ is hydrogen or methyl, n is an integer from 1 to 3, and A is a ring structure according to any of Formulas II-VI:

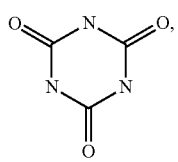

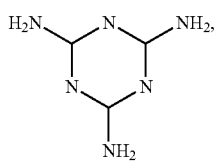

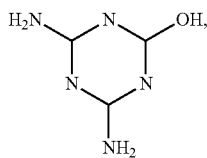

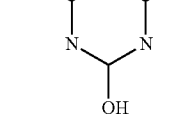 and/or

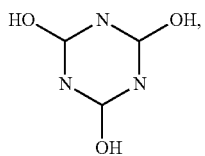

preferably wherein the isocyanurate triacrylate monomers comprise tris (2-hydroxyethyl)isocyanurate triacrylate monomers.

M. The fabric care composition according to any of paragraphs A-L, wherein the shells of the encapsulates are substantially free of melamine derivatives.

N. The fabric care composition according to any of paragraphs A-M, wherein the encapsulates are characterized by a volume weighted median encapsulate size from about 0.5 microns to about 100 microns, or from 10 to 100 microns, preferably from about 1 micron to about 60 microns, or even 10 microns to 50 microns, or even 20 microns to 45 microns, or alternatively 20 microns to 60 microns.

O. The fabric care composition according to any of paragraphs A-N, wherein the core of the perfume encapsulates further comprise a partitioning modifier, preferably a partitioning modifier selected from the group consisting of vegetable oil, modified vegetable oil, mono-, di-, and tri-esters of $C_4$-$C_{24}$ fatty acids, isopropyl myristate, dodecanophenone, lauryl laurate, methyl behenate, methyl laurate, methyl palmitate, methyl stearate, and mixtures thereof, more preferably isopropyl myristate.

P. The fabric care composition according to any of paragraphs A-O, wherein the composition is in the form of a liquid composition, a granular composition, a single-compartment pouch, a multi-compartment pouch, a dissolvable sheet, a pastille or bead, a fibrous article, a tablet, a bar, a flake, a dryer sheet, or a mixture thereof, preferably a liquid, solid, or mixture thereof, more preferably a liquid.

Q. The fabric care composition according to any of paragraphs A-P, wherein the composition is a liquid composition that comprises from about 10% to about 90%, by weight of the composition, of water, preferably from about 25% to about 80%, more preferably from about 45% to about 70%.

R. The fabric care composition according to any of paragraphs A-Q, wherein the fabric care composition is characterized by a pH of from about 2 to about 12, or from about 2 to about 8.5, or from about 2 to about 7, or from about 2 to about 5, or from about 2 to about 4, from about 2 to about 3.7, more preferably from about 2 to about 3.5.

S. The fabric care composition according to any of paragraphs A-R, wherein the composition further comprises a fabric conditioning material selected from silicones, non-ester quaternary ammonium compounds, amines, fatty esters, sucrose esters, silicones, dispersible polyolefins, polysaccharides, fatty acids, softening or conditioning oils, polymer latexes, or combinations thereof, preferably silicones, more preferably where the quaternary ammonium ester compound and the silicone are present in a weight ratio of from about 1:10 to about 10:1, or from about 1:5 to about 5:1, or from about 1:3 to about 1:3, or from about 1:2 to about 2:1, or about 1:1.5 to about 1.5:1, or about 1:1.

T. A method of treating a fabric, the method comprising a step of contacting the fabric with a fabric care composition according to any of paragraphs A-S.

Test Methods

Method of Measuring Iodine Value of a Quaternary Ammonium Ester Compound

The iodine value of a quaternary ammonium ester fabric compound is the iodine value of the parent fatty acid from which the fabric conditioning active is formed, and is defined as the number of grams of iodine which react with 100 grams of parent fatty acid from which the fabric conditioning active is formed.

First, the quaternary ammonium ester compound is hydrolysed according to the following protocol: 25 g of fabric treatment composition is mixed with 50 mL of water and 0.3 mL of sodium hydroxide (50% activity). This mixture is boiled for at least an hour on a hotplate while avoiding that the mixture dries out. After an hour, the mixture is allowed to cool down and the pH is adjusted to neutral (pH between 6 and 8) with sulfuric acid 25% using pH strips or a calibrated pH electrode.

Next the fatty acid is extracted from the mixture via acidified liquid-liquid extraction with hexane or petroleum ether: the sample mixture is diluted with water/ethanol (1:1) to 160 mL in an extraction cylinder, 5 grams of sodium chloride, 0.3 mL of sulfuric acid (25% activity) and 50 mL of hexane are added. The cylinder is stoppered and shaken for at least 1 minute. Next, the cylinder is left to rest until 2 layers are formed. The top layer containing the fatty acid in hexane is transferred to another recipient. The hexane is then evaporated using a hotplate leaving behind the extracted fatty acid.

Next, the iodine value of the parent fatty acid from which the fabric conditioning active is formed is determined following ISO3961:2013. The method for calculating the iodine value of a parent fatty acid comprises dissolving a prescribed amount (from 0.1-3 g) into 15 mL of chloroform. The dissolved parent fatty acid is then reacted with 25 mL of iodine monochloride in acetic acid solution (0.1M). To this, 20 mL of 10% potassium iodide solution and 150 mL deionised water is added. After the addition of the halogen has taken place, the excess of iodine monochloride is determined by titration with sodium thiosulphate solution (0.1M) in the presence of a blue starch indicator powder. At the same time a blank is determined with the same quantity of reagents and under the same conditions. The difference between the volume of sodium thiosulphate used in the blank and that used in the reaction with the parent fatty acid enables the iodine value to be calculated.

Method of Measuring Fatty Acid Chain Length Distribution

The fatty acid chain length distribution of the quaternary ammonium ester fabric conditioning active refers to the chain length distribution of the parent fatty acid from which the fabric conditioning active is formed. It can be measured on the quaternary ammonium ester conditioning active or on the fatty acid extracted from the fabric softener composition as described in the method to determine the iodine value of a quaternary ammonium ester fabric conditioning active. The fatty acid chain length distribution is measured by dissolving 0.2 g of the quaternary ammonium ester conditioning active or extracted fatty acid in 3 mL of 2-butanol, 3 glass beads are added and the sample is vortexed at high speed for 4 minutes. An aliquot of this extract is then transferred into a 2 mL gas chromatography vial, which is then injected into the gas chromatogram inlet (250° C.) of the gas chromatograph (Agilent GC6890N) and the resultant bi-products are separated on a DB-5 ms column (30 m×250 µm×1.0 µm, 2.0 mL/min). These bi-products are identified using a mass-spectrometer (Agilent MSD5973N, Chemstation Software version E.02.02) and the peak areas of the corresponding fatty acid chain lengths are measured. The fatty acid chain length distribution is determined by the relative ratios of the peak areas corresponding to each fatty acid chain length of interest as compared to the sum of all peaks corresponding to all fatty acid chain lengths.

Fabric Treatment Method and Evaluation

To treat the fabrics of Examples 1-3, the following method is followed. For each treatment, a washing machine (ex Miele) is loaded with about 3 kg of a fabric load. The fabric load comprises about 1100 g knitted cotton fabric and about 1100 g polyester-cotton fabrics (50/50). Additionally, the fabric load comprises eighteen terry towel tracers, which weigh together about 780 g.

Prior to the test treatment, the load is preconditioned twice, each time using the 95° C. short cotton cycle with 79 g of unperfumed IEC A Base detergent (ex WFK Testgewebe GmbH), followed by two additional 95° C. washes without detergent.

For the test treatment, the load is washed using a 40° C. short cotton cycle, 1200 rpm spin speed with 79 g IEC A Base detergent, which is added at the start of the wash cycle in the appropriate dispenser. A dosage of 35 g of test fabric treatment composition (e.g., according to Examples 1-3) is added in the appropriate dispenser.

For each test composition, the fabric treatment method is performed twice, once for the "wet" touchpoint evaluation, and once for the "dry" and "rub" touchpoints. For the wet touchpoint, the terry towel tracers are evaluated while wet for perfume intensity. For the dry and rub touchpoints, the terry towels are line dried after the fabric treatment and evaluated the next day for perfume intensity, both pre-rub (dry) and after rubbing the fabric (rub).

Perfume Intensity Evaluation

Perfume intensity evaluation is conducted by a trained panel. The panel grades on a perfume odor intensity scale from 0 to 100, where 0=no perfume odor, 25=slight perfume odor, 50=moderate perfume odor, 75=strong perfume odor, and 100=extremely strong perfume odor. Fabrics are evaluated for perfume intensity at the wet, dry, and/or rub touchpoints.

EXAMPLES

The examples provided below are intended to be illustrative in nature and are not intended to be limiting.

For Examples 1, 2, and 3, liquid fabric enhancer products having the general formula according to Table 1 below are prepared. For the experimental trials, the type of ester quat and the type of encapsulates are varied as described in more detail below.

TABLE 1

| Ingredient | % Active |
|---|---|
| Quaternary ammonium ester material ("ester quat") | 5.00% |
| Perfume encapsulates* | 0.33% |
| Formic Acid | 0.045% |
| Hydrochloric acid | 0.010% |
| Preservative | 0.0045% |
| Chelant | 0.0071% |
| Structurant | 0.11% |
| Water | Balance |

*Here, the "% Active" refers to the amount of perfume. For example, the encapsulates may be about 33 wt % perfume, by weight of the encapsulates; thus, 1 part encapsulates are present in 100 parts composition, thereby providing 0.33% perfume, by weight of the composition.

The liquid fabric softener compositions of Examples 1-3 are prepared according to the following procedure. Water, chelant, hydrochloric acid, formic acid, and preservative are mixed in a glass beaker with a magnetic stirrer. The resulting aqueous solution is heated up in an oven at 85° C. The ester quat material is heated up in an oven at 85° C. While still hot, the aqueous solution and the ester quat are mixed with an overhead mixer. The obtained dispersion is cooled down by letting it rest in a room at 21° C. After cooling, the encapsulates and structurant are added to the dispersion using an ultraturax mixer 2,000 RPM for 30 seconds. The pH of each product is approximately 2.5.

The identities of the ester quats (A, B, or C) and the encapsulate wall materials (W, X, Y, or Z), as varied in Examples 1, 2, and 3, are provided in Table 2. The encapsulates comprising wall materials W and X (e.g., polyacrylate materials) further include a partitioning modifier (isopropyl myristate) in the core, in addition to the core's perfume materials. Encapsulate wall materials W and X are polyacrylates and are materials according to the present disclosure. Encapsulate wall materials Y and Z are comparative materials.

TABLE 2

| | Softening Active |
|---|---|
| A | Ester quat[1] derived from a diethanolamine (with chloride counterion) |
| B | Ester quat[2] derived from a di-isopropanolamine (with methyl sulfate counterion) |
| C | Ester quat[3] derived from a triethanolamine (with methyl sulfate counterion) |

| | Primary Encapsulate Shell Material |
|---|---|
| W | Polyacrylate derived from a hexafunctional acrylate monomer[4] |
| X | Polyacrylate derived from an isocyanurate triacrylate monomer[5] |
| Y (comp.) | Cross-linked melamine-formaldehyde[6] |
| Z (comp.) | Cross-linked melamine-formaldehyde; encapsulate coated with cationic deposition polymer[7] |

[1] N,N-bis(hydroxyethyl)-N,N-dimethyl ammonium chloride fatty acid ester, produced from C12-C18 fatty acid mixture (REWOQUAT CI-DEEDMAC, ex Evonik)
[2] Mixture of bis-(2-hydroxypropyl)-dimethylammonium methylsulfate fatty acid ester, (2-hydroxypropyl)-(1-methyl-2-hydroxyethyl)-dimethylammonium methylsulfate fatty acid ester, and bis-(1-methyl-2-hydroxyethyl)-dimethylammonium methylsulfate fatty acid ester, where the fatty acid esters are produced from a C12-C18 fatty acid mixture (REWOQUAT DIP V 20 M Conc, ex Evonik)
[3] Esterification product of fatty acids (C16-18 and C18 unsaturated) with triethanolamine, quaternized with dimethyl sulphate (REWOQUAT WE 18, ex Evonik)
[4] CN975 (ex Sartomer, Inc.); shell further includes residual PVOH from encapsulation process
[5] SR368 (ex Sartomer, Inc); shell further includes residual PVOH from encapsulation process
[6] Capsules obtained from Encapsys, LLC (Appleton, WI)
[7] Capsules obtained from Encapsys, LLC; deposition polymer is polyvinyl formamide polymer For the perfume intensity scores provided in Examples 1-3, perfume intensity scores within the same leg (e.g., Leg A) that are not linked by at least one common letter (e.g., a, b, c, and/or d) are considered different to a statistically significant degree (90% confidence). Due to the experimental design, trials from different legs cannot be directly compared statistically; however, certain trends may still be observed, as the panelists are trained to provide scores on an absolute scale.

Example 1. Wet Touchpoint

Fabrics are treated according to the test method provided above with liquid fabric enhancers having the encapsulates and softening actives as provided in Table 3. After treatment, the treated fabrics are evaluated for perfume intensity at the wet touchpoint, according to the test method provided above. Perfume intensity results are provided in Table 3.

TABLE 3

| | | Encapsulate | Perfume Intensity (scale = 0 to 100) | | |
|---|---|---|---|---|---|
| Leg | Trial | Wall Material | Ester Quat A | Ester Quat B | Ester Quat C |
| A | 1 | W | 52.5 d | 56.3 c | 53.1 d |
| | 2 | X | 61.3 b | 59.1 bc | 65.8 a |
| B | 3 | Y (comp.) | 53.3 a | 50.8 a | 50.2 a |
| | 4 | Z (comp.) | 42.1 b | 44.1 b | 45.8 b |

According to the results shown in Table 3, fabric enhancers comprising ester quat C and encapsulates comprising wall material X provide the greatest perfume intensity at the wet touchpoint. Additionally, the encapsulates of Leg A appear to provide greater perfume intensities than the encapsulates of Leg B when coupled with softening actives B and C.

Example 2. Dry Touchpoint

Fabrics are treated according to the test method provided above with liquid fabric enhancers having the encapsulates and ester quats as provided in Table 4. After treatment, the treated fabrics are evaluated for perfume intensity at the dry touchpoint, according to the test method provided above. Perfume intensity results are provided in Table 4.

TABLE 4

| | | Encapsulate | Perfume Intensity (scale = 0 to 100) | | |
|---|---|---|---|---|---|
| Leg | Trial | Wall Material | Ester Quat A | Ester Quat B | Ester Quat C |
| C | 5 | W | 50.1 bc | 50.0 bc | 53.4 a |
| | 6 | X | 45.0 d | 48.8 c | 51.3 b |
| D | 7 | Y (comp.) | 41.2 a | 43.9 bc | 41.1 c |
| | 8 | Z (comp.) | 48.2 a | 45.9 ab | 42.9 bc |

According to the results shown in Table 4, fabric enhancers comprising ester quat C and encapsulates comprising wall material W provide the greatest perfume intensity at the dry touchpoint. It is also notable that encapsulates comprising wall material X perform provide greater perfume intensity when coupled with ester quats B or C, compared to when coupled with ester quat A. Additionally, the encapsulates of Leg C appear to provide greater perfume intensities than the encapsulates of Leg D when coupled with softening actives B and C.

Further, comparative encapsulates comprising wall materials Y or Z generally provide the greatest perfume intensity when coupled with, for example, ester quat A compared to being coupled with B or C.

Example 3. Rub Touchpoint

Fabrics are treated according to the test method provided above with liquid fabric enhancers having the encapsulates and ester quats as provided in Table 5. After treatment, the treated fabrics are evaluated for perfume intensity at the rub touchpoint, according to the test method provided above. Perfume intensity results are provided in Table 5.

TABLE 5

| | | Encapsulate | Perfume Intensity (scale = 0 to 100) | | |
|---|---|---|---|---|---|
| Leg | Trial | Wall Material | Ester Quat A | Ester Quat B | Ester Quat C |
| E | 9 | W | 60.5 a | 58.2 ab | 60.6 a |
| | 10 | X | 53.1 c | 57.6 b | 60.5 a |
| F | 11 | Y (comp.) | 56.6 ab | 54.0 bc | 50.7 c |
| | 12 | Z (comp.) | 57.4 a | 55.8 ab | 54.2 ab |

According to the results shown in Table 5, encapsulates comprising wall material X coupled with ester quats B or C provide greater perfume intensities compared to similar encapsulates coupled with softening active A. Additionally, the encapsulates of Leg E appear to provide greater perfume intensities than the encapsulates of Leg F when coupled with ester quats B and C.

Furthermore, comparative encapsulates comprising wall materials Y or Z appear to directionally provide improved performance when coupled with softening active A.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A liquid fabric care composition comprising:
    A) perfume encapsulates, wherein the perfume encapsulates comprise a shell and a perfume core surrounded by the shell, the shell comprising a (meth)acrylate material, wherein the (meth)acrylate material is derived from a monomer selected from the group consisting of a hexafunctional aromatic acrylate, an isocyanurate triacrylate, or mixtures thereof; and
    B) about 3% to about 25% of a quaternary ammonium ester compound comprising from about 40.0% to about 60.0%, by weight of the quaternary ammonium ester compound, of a diester quaternary ammonium material ("diester quat"), and from about 15% to about 38.0%, by weight of the quaternary ammonium ester compound, of triester quaternary ammonium material ("triester quat").

2. The fabric care composition according to claim 1, wherein the quaternary ammonium ester compound comprises compounds according to Formula (I):

wherein:
    m is 1, 2 or 3, with provisos that
        in a given molecule, the value of each m is identical, and
        for at least some of the compounds according to Formula (I), m is 3 (i.e., a triester);
    each $R^1$, which independently comprises from 13 to 22 carbon atoms, is independently a linear hydrocarbyl or branched hydrocarbyl group;
    each $R^2$ is independently a $C_1$-$C_3$ alkyl or hydroxyalkyl group and/or each $R^2$ is selected from methyl, ethyl, propyl, hydroxyethyl, 2-hydroxypropyl, 1-methyl-2-hydroxyethyl, poly($C_2$-$C_3$ alkoxy), polyethoxy, or benzyl;
    each X is independently —$(CH_2)_n$-, —$CH_2$—CH($CH_3$)— or —CH($CH_3$)—$CH_2$—, where each n is independently 1, 2, 3 or 4;
    each Y is independently —O—(O)C— or —C(O)—O—; and
    A- is independently selected from the group consisting of chloride, bromide, methyl sulfate, ethyl sulfate, sulfate, and nitrate.

3. The fabric care composition according to claim 2, wherein in the compound according to Formula (I), A- is methyl sulfate.

4. The fabric care composition according to claim 2, wherein in at least some of the compounds according to Formula (I), at least one $R^2$ is a hydroxyethyl group.

5. The fabric care composition according to claim 2, wherein for at least some of the compounds according to Formula (I),
    m is 2, and each X is selected from *—$CH_2$—CH($CH_3$)—, *—CH($CH_3$)—$CH_2$—, or a mixture thereof, where the * indicates the end nearest the nitrogen of the quaternary ammonium ester compound.

6. The fabric care composition according to claim 1, wherein the quaternary ammonium ester compound comprises a mixture of:
    bis-(2-hydroxypropyl)-dimethylammonium methyl sulfate fatty acid ester,
    (2-hydroxypropyl)-(1-methyl-2-hydroxyethyl)-dimethylammonium methyl sulfate fatty acid ester, and
    bis-(1-methyl-2-hydroxyethyl)-dimethylammonium methyl sulfate fatty acid ester,
    where the fatty acid esters are produced from a C12-C18 fatty acid mixture.

7. The fabric care composition according to claim 1, wherein the ammonium quaternary ester compound comprises material derived from unsaturated fatty acids and triethanolamine, where the unsaturated fatty acids comprise eighteen carbons and a single double bond ("C18:1 fatty acids").

8. The fabric care composition according to claim 1, wherein the quaternary ammonium ester compound is derived from triethanolamines.

9. The fabric care composition according to claim 1, wherein the quaternary ammonium ester compound is derived from fatty acids characterized by an iodine value of from 0 to 140.

10. The fabric care composition according to claim 1, wherein the (meth)acrylate material is derived from a monomer selected from a hexafunctional aromatic urethane acrylate, a tris (2-hydroxyethyl)isocyanurate triacrylate, or mixtures thereof.

11. The fabric care composition according to claim 1, wherein the (meth)acrylate material comprises isocyanurate triacrylate monomers having a structure according to Formula I:

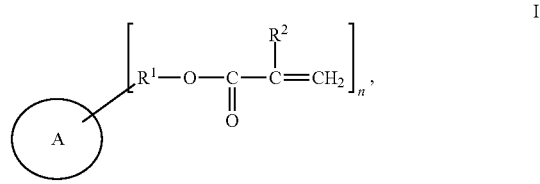

wherein $R^1$ is selected from $C_1$ to $C_8$,
$R^2$ is hydrogen or methyl,
n is an integer from 1 to 3, and A is a ring structure according to any of Formulas II-VI:

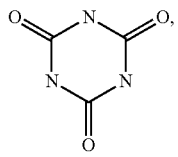

II

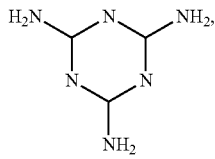

III

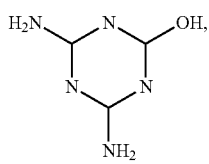

IV

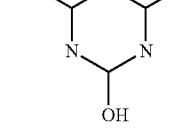 and/or

V

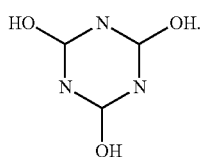

VI

12. The fabric care composition according to claim 1, wherein the shells of the encapsulates are substantially free of melamine derivatives.

13. The fabric care composition according to claim 1, wherein the encapsulates are characterized by a volume weighted median encapsulate size from about 0.5 microns to about 100 microns.

14. The fabric care composition according to claim 1, wherein the core of the perfume encapsulates further comprise a partitioning modifier selected from the group consisting of vegetable oil, modified vegetable oil, mono-, di-, and tri-esters of $C_4$-$C_{24}$ fatty acids, isopropyl myristate, dodecanophenone, lauryl laurate, methyl behenate, methyl laurate, methyl palmitate, methyl stearate, and mixtures thereof.

15. The fabric care composition according to claim 1, wherein the composition further comprises from about 10% to about 90%, by weight of the composition, of water.

16. The fabric care composition according to claim 1, wherein the fabric care composition is characterized by a pH of from about 2 to about 12.

17. The fabric care composition according to claim 1, wherein the composition further comprises a fabric conditioning material selected from the group consisting of silicones, non-ester quaternary ammonium compounds, amines, fatty esters, sucrose esters, silicones, dispersible polyolefins, polysaccharides, fatty acids, softening or conditioning oils, polymer latexes, or combinations thereof.

18. A method of treating a fabric, the method comprising a step of contacting the fabric with a fabric care composition according to claim 1.

19. The fabric care composition according to claim 1, wherein the quaternary ammonium ester compound is present at a level of from 5% to 15%, by weight of the composition.

* * * * *